United States Patent Office 3,242,073
Patented Mar. 22, 1966

3,242,073
REMOVAL OF MICROORGANISMS FROM FLUIDS
Kenneth W. Guebert and Johnnie D. Laman, Lake Jackson, Tex., assignors to The Dow Chemical Company, Midland, Mich., a corporation of Delaware
No Drawing. Filed Mar. 7, 1963, Ser. No. 263,417
9 Claims. (Cl. 210—64)

The present invention concerns the removal of microorganisms from fluids. More specifically, the invention concerns a rapid flow rate filtration method capable of separating microorganisms from large volumes of fluids.

A wide variety of filters are presently employed in methods designed to effect removal of microorganisms from fluids. Examples of these filters include porous sintered glass, nitro-cellulose ester, porous porcelain and asbestos media. These methods generally depend upon mechanical entrapment to achieve their purpose and this dependance necessitates the use of filter media which have openings or passageways of a magnitude comparable to that of the microorganisms to be removed. The extremely small passageways required are responsible for a high pressure drop between the influent and effluent sides of the filter and a slow rate of flow during fluid filtration. Other inherent disadvantages of the filters employed in the prior art methods include low capacities, due to rapid clogging of the minute passageways, and high cost. In addition, the microorganisms filtered from the fluid frequently have rapid growth rates and spread through the filter media to the effluent side where contamination of the filtrate occurs. These filter media must usually be pre-sterilized and carefully protected against contamination prior to use. Although some of these known filter media are capable of completely removing bacteria from small quantities of liquids, they are generally ineffective in removing smaller sized microorganisms such as viruses.

It is an object of the present invention to provide a method for the removal of microorganisms from fluids by filtration. It is another object to provide such a method characterized by rapid flow rates and long filter cycles. Another object is to provide such a method employing filter media which are unaffected by exposure to non-sterile conditions prior to use. It is another object to provide such a method which removes both bacterial and viral microorganisms from fluids. Further objects and advantages of the present invention will be evident from the following description.

In the method of the present invention microorganisms are removed from fluids by passing the fluids through a specially prepared filter medium which comprises a conventional anionic-type filter aid having a cationic, organic, polyelectrolyte coating. The term "filter aid" will be used herein to designate any one or more of the wide variety of fibrous or particulate materials employed for filtration purposes. A large majority of filter aids are characterized by an electronegatively charged surface and these will be referred to as "anionic-type" filter aids. Examples of anionic-type filter aids, which are suitable for use in preparing the coated filter media employed in the method of the present invention, include diatomaceous earth, paper filter pulp, fuller's earth, charcoal, anthracite coal, sand and the like.

The use of the specially prepared filter media described above enables the removal of microorganisms from large volumes of fluids passed through the coated filter aid media at rapid flow rates. These media show tenacious retention of the microorganisms, thus obviating the necessity for pre-sterilization and elaborate handling precautions, prior to use, and reducing the previously discussed problem of filtrate contamination resulting from the normally rapid growth of microorganisms through a filter to the effluent side.

The coated filter aids employed in the method of the present invention are prepared by treating an anionic-type filter aid with a small amount of a cationic, organic, polyelectrolyte. This treatment is advantageously accomplished by spraying the filter aid with a dilute solution of the cationic polyelectrolyte, or by addition of the polyelectrolyte to a slurry of the filter aid followed by drying of the resulting coated filter aid at a temperature less than the decomposition temperature of the polyelectrolyte coating on the filter aid. Alternatively, the cationic polyelectrolyte may be added to a slurry of the filter aid prior to deposition of the filter aid on the filter support.

The organic, cationic, polyelectrolytes employed in preparing the coated filter aids used in the method of the present invention form an adherent surface coating on the anionic-type filter aids due to the electrostatic attraction of the oppositely charged materials. It is essential that only a portion of the total cationic charge sites of the polyelectrolyte is neutralized in this bonding action, thus leaving positively charged sites available to attract and hold microorganisms which are to be removed from fluids passed through the coated filter aid material. In order to provide these non-neutralized sites, the polyelectrolyte must be substantially linear and must contain a minimum number of available charge sites per molecule. This minimum number is about ten charge sites per molecule, but a substantially larger number of charge sites per molecule is preferred. Cationic polyelectrolytes which are especially efficacious for use in the treatment of anionic-type filter aids, for use in the method of the present invention, are those prepared (1) by the polymerization of alkylenimines, e.g. ethylenimine, to form polyalkylenimines and (2) by the condensation reaction of dihaloalkanes with polyalkylenepolyamines, e.g. ethylene dichloride and triethylenetetraamine, to form polymeric polyalkylenepolyamines. These polymers possess a very high ratio of cationic charge sites to molecular weight and are conveniently employed in aqueous solutions of the desired concentration, as explained below, to coat the anionic-type filter aids. Although these polymers are normally water-soluble, they form an adherent coating on the filter aid which is not removed by contact with water. The molecular weight of the cationic polyelectrolyte is not critical provided that the previously discussed minimum number of cationic charge sites are available.

Other examples of suitable cationic, organic, polyelectrolytes include polyvinylbenzyltrimethyl ammonium chloride, dimethylaminoethyl polymethacrylate and copolymers of N-2-hydroxyethyl aziridine and bis(3-aziridinyl-2-hydroxy-n-propyl)ether.

In summary, any substantially linear, cationic, organic polyelectrolyte containing a minimum of about 10 available charge sites per molecule may be employed to prepare coated filter aids for use in the method of this invention, although those polyelectrolytes having cationic groups which are at least as basic as primary amine groups are most advantageously utilized. Those polyelectrolytes having the most strongly cationic groups such as the "onium" groups, e.g., ammonium, phosphonium, pyridinium and sulfonium groups, are preferred.

A concentration of from about 5 to 30 weight percent of the cationic polyelectrolyte in aqueous solution is preferably employed as a stock solution to spray-treat the anionic-type filter aid. The more dilute solutions have a lower viscosity and are easier to use but result in the addition of more water to the filter aid. The water does not interfere with the performance of the coated filter aid, but the added weight due to water retained in the coated filter aid may be undesirable. When a filter aid slurry treatment procedure is employed the polymer concentration in the slurry is not critical. Many particulate types of filter aids, such as diatomaceous earth, require large amounts of water to form a slurry. In their case, a solution containing 0.2 percent by weight or less of polymer is advantageous. More concentrated solutions may result in an excess of polymer being added merely to obtain sufficient liquid to obtain a slurry. This excess polymer will be lost when washing the coated filter aid, or during the filter cycle if the coated material is not washed, and therefore increases costs or results in filtrate contamination. Irrespective of the filter aid coating procedure employed, more polyelectrolyte may be present than can be held on the filter media by electrostatic attraction. This excess polyelectrolyte will be washed off during use or when forming the coated filter media on the filter support. If the presence of this excess polyelectrolyte is objectionable, the first volume of filtrate may be diverted or, alternatively, the coated filter aid may be washed before applying onto the filter support.

Polymer concentrations less than 0.2 weight percent, e.g. in the range of 0.01 weight percent, may be used in the slurry if desired. Even more dilute solutions can be employed but this requires handling large amounts of liquids in relation to the weight of filter aid coated since a polymer coating of from about 0.1 to 0.2 weight percent, based on the coated filter aid weight, is generally preferred.

The treatment of anionic-type filter aids with these aqueous polymer solutions results in a filter aid material having from about 0.01 to 2.00 weight percent polymer, based on total weight of the coated filter aid, as an adherent surface coating. The amount of polymer coating will depend upon the concentration of polymer in the treating solution, the concentration of polymer cationic charge and the filter aid employed.

Although the method of the present invention is capable of handling large volumes of fluids during extended filter cycles it should be noted that the filter cycle length may be extended even further by the addition of body feed, i.e. addition of untreated filter aid to the influent fluid stream, such as is practiced in other types of known filtration procedures. The filter cycle may also be extended by the addition of more of the cationic, organic, polyelectrolyte coating material to the coated filter aid when an appreciable percentage of the cationic charge sites originally available on the coated filter aid have collected microorganisms during the filtration process. This addition, during the filter cycle, will re-coat the filter media and thus replenish the cationic sites available to attract and hold microorganisms.

The following examples describe completely representative specific embodiments of the present invention. These examples are not to be interpreted as limiting the invention other than as defined in the claims.

EXAMPLE 1

The necessity of having a minimum of approximately 10 available cationic charge sites per molecule of polyelectrolyte used to coat the anionic-type filter aids is shown by the results in Table I, below. These results were obtained by the following procedure.

A slurry was prepared by mixing 40 grams of diatomaceous earth, hereafter DE, and 100 ml. of an aqueous solution containing 0.2 weight percent of the polyelectrolyte designated in Table I, below. This slurry was gently stirred for 15 minutes and deposited on a Buechner funnel, containing a filter paper to furnish support for the coated filter aid, to form a filter bed. This filter bed was then washed with four portions of de-ionized water in order to remove any excess polymer. A quantity of 500 ml. of water contaminated with bacteria was then passed through the filter bed by gravity flow and bacteria counts determined for the effluent.

Table I

| Polyelectrolyte | Charge Sites [1] | Bacteria Count per ml. | |
|---|---|---|---|
| | | Influent | Effluent |
| Tetraethylenepentaamine | 5 | 1,310,000 | 100 |
| Pentaethylenehexaamine | 6 | 1,310,000 | 60 |
| PAPA [2] | 10 | 2,230,000 | 0 |
| PEI [3] | 46–115 | 2,230,000 | 0 |

[1] Number of available cationic charge sites per molecule.
[2] Polyalkylenepolyamine—a condensation product of pentaethylenehexaamine and ethylene dichloride having an average molecular weight of 400.
[3] Polyethylenimine—molecular weight range of 2,000 to 5,000.

EXAMPLE 2

A variety of bacteria were employed to contaminate sterile water samples and these samples were then passed through various filters to test their capabilities to remove these microorganisms. Twenty-four hour broth cultures of *Escherichia coli*, *Staphylococcus albus* and *aureus*, alpha and gamma hemolytic *Streptococcus* and *Aerobacter aerogenes* were employed as the microorganisms in these tests. One ml. of a test culture was added to 100 ml. of sterile distilled water and total plate counts of the number of organisms present were determined by preparing serial dilutions.

The seeded samples were then filtered rapidly, under vacuum, through sterile Buechner funnels containing a filter bed of DE coated with (1) an organic, cationic polyelectrolyte or (2) aluminum hydroxide. An untreated DE filter bed was used as a control. The polyethylenimine (hereafter PEI) coated DE was prepared by spraying the polymer as an approximately 15 weight percent aqueous solution onto the DE. The other polyelectrolyte coatings were applied by the previously described slurry method. The aluminum hydroxide coated filter aid was prepared by forming an aqueous slurry of DE, aluminum sulfate and soda ash, agitating the slurry for 15 minutes, depositing the slurry on the filter support and washing with water to remove excess materials. The coated filter aid contained about 2 percent by weight of aluminum hydroxide. The bacterial comparison counts of the influent and effluent are recorded in Table II, below.

Table II

| DE filter aid | Microorganism | Bacteria count per ml. | |
|---|---|---|---|
| | | Pre-filtration | Post-filtration |
| Untreated | E. coli | 310,000 | 210,000 |
| 0.2% PEI | E. coli | 17,000 | 0 |
| Untreated | S. albus | 130,000 | 88,000 |
| 0.2% PEI | S. albus | 76,000 | 0 |
| 2% Al(OH)₃ | S. albus | 7,300 | 60 |
| 0.2% PEI | α Streptococcus | 5,000 | 0 |
| 0.2% PEI | Aerobacter aerogenes | 490,000 | 0 |
| 1.0% polyazetidine [1] | Aerobacter aerogenes | 50,000 | 0 |
| 1.0% polyaziridine [2] | Aerobacter aerogenes | 82,000 | 0 |
| Do.[2] | Gamma Streptococcus | 23,000 | 0 |
| Do.[2] | E. coli | 62,000 | 0 |
| Do.[2] | S. albus | 56,000 | 0 |

[1] Polyazetidine—polymeric N,N-diethyl-3-hydroxy azetidine.
[2] Polyaziridine—copolymer of N-2-hydroxyethyl aziridine and bis(3-aziridinyl-2-hydroxy-n-propyl) ether.

Although the inorganic coated DE produced a marked reduction in bacterial count, the rapid growth rates of bacteria make the presence of even a very few bacteria intolerable when sterile effluent is desired.

EXAMPLE 3

Filtering grade sand, about 0.5 mm. diameter, was soaked for 12 hours in an aqueous 0.5 weight percent PEI solution to establish equilibrium. All excess PEI was then washed off with deionized water and an 18 inch high column of this treated sand was placed in a 36 inch vertical glass tube having a diameter of 1 inch. All equipment was sterilized by autoclaving prior to addition of the coated sand. The sand was fluidized by a back-wash with sterile water and then allowed to settle with an inch of water above the sand level. The feed consisted of 700 mls. of sterile water inoculated with *Escherichia coli* and was filtered at a gravity rate of 30 ml. per minute. Serial dilutions of the prefiltrate and post filtrate were employed to determine total bacterial population. Untreated sand and sand coated with aluminum hydroxide were employed in otherwise identical runs for the purpose of comparison. The aluminum hydroxide coated sand was prepared by the method described in U.S. Patent 2,832,473. Table III, below, is a compilation of the results obtained.

*Table III*

| Filter media | Bacterial Count per ml. | |
|---|---|---|
| | Pre-filtration | Post-filtration |
| Untreated sand | 80,000 | 69,000 |
| Do | 86,000 | 50,000 |
| Sand coated with Al(OH)₃ | 19,000 | 20 |
| Sand coated with PEI | 82,000 | 0 |

Once again the significance of the results resides in the necessity for complete removal of bacteria since even the relatively small numbers allowed to pass through into the filtrate by the aluminum hydroxide coated sand are capable of rapid growth and rebuild-up of the bacterial population.

Total removal of intestinal parasites by filtration through 0.6 mm. sand, coated using the same technique as described above, at rapid filtration rates was also accomplished. *Endoameba hisloyltica, Endolimax nina* and *Enterobius vermicularia* were used to inoculate a sterile water influent. Total removal of these microorganisms was observed at a flow rate of 2 gallons per minute per square foot of filter area.

EXAMPLE 4

The removal of microorganisms from a variety of liquids was demonstrated with DE having an 0.2 weight percent PEI coating employed as the filter media. Beer containing 400 microorganisms per ml. was filtered at a rate of a liter/min. through a No. 2 Buechner funnel containing a ¼ inch thick layer of the coated filter aid with complete removal of the microorganisms being observed. In a similar manner, kerosene contaminated by 130,000 microorganisms/ml. was sterilized by passage through this coated filter aid medium with no blinding or plugging of the filter media.

EXAMPLE 5

Extended filtration runs were conducted using an 0.25 sq. ft. pressure diatomaceous earth filter system with a flow rate of 4 gallons per min./sq. ft. filter area. The DE was spray treated with an aqueous PEI solution to provide 40 grams of a coated filter aid containing 0.2 weight percent PEI. A 600 gallon tank of water was seeded with 24 hour broth cultures of *Escherichia coli*. Table IV, below, shows the bacterial count of the pre-filtrate and post-filtrate at various time intervals over a total period of almost 20 hours.

*Table IV*

| Time | Bacterial Count/ml. | |
|---|---|---|
| | Tank (influent) | Effluent |
| ¼ hr | 4,000 | 0 |
| 1 hr | 5,000 | 0 |
| 2 hrs | 4,800 | 0 |
| 3 hrs | 3,900 | 0 |
| 19½ hrs | 6,000 | 0 |

EXAMPLE 6

The following experiment was conducted to demonstrate the effectiveness of the present method to remove viral organisms from fluids. In a series of runs, 10.0 gram quantities of coated diatomaceous earth, having 0.2 weight percent PEI was slurried with 100 ml. of a standard nutrient medium containing 0, 5, 10, or 20 weight percent horse serum. Each such slurry was filtered through a filter paper in a Beuchner funnel to form a filter bed and portions of the filtrate were tested in established monolayer tissue cultures of bovine kidney tissue. No evidence of toxicity of such filtrates to the tissue cultures was observed. Immediately after filtering the nutrient medium to form the filter bed, 100 ml. of a suspension of infectious bovine rhinotracheitis virus, hereafter IBR, was passed through the filter bed. Serial dilutions of the filtrate from each filter bed were inoculated into tubes containing cultures of bovine kidney established cells. The cultures were then incubated under good growing conditions and observed for the development of the characteristic cytopathological effect indicative of the presence of IBR virus. The suspension of IBR virus employed as starting material represented harvests from tissue cultures of the virus which had been pooled to provide 500 ml. of a suspension which assayed $10^{5.5}$ tissue culture infectious doses—50 percent, hereafter $TCID_{50}$, of IBR virus per 0.2 ml. This value is determined from that dilution at which there is a cytopathogenic effect observed in 50 percent of the culture tubes inoculated with said dilution. The results of these experiments showed no cytopathogenic effect when corresponding assays were carried out with the filtrates from the coated filter aid beds which had been prepared from slurries containing 0, 5, 10 and 20 weight percent horse serum.

EXAMPLE 7

The effectiveness of the method of the present invention in removing microorganisms from commercially employed dry cleaning solvents was tested by inoculating a 1:1 weight ratio, tetrachloroethylene:water solution, with various bacteria and then filtering the contaminated solution through forty grams of DE having an 0.2 weight percent coat of PEI. A standard No. 2 Buechner funnel was employed. The dilution of the dry cleaning solvent was necessary since 100% tetrachloroethylene is toxic to the bacteria employed. The coated DE was prepared by spray-treatment of DE with an aqueous solution of PEI. The tetrachloroethylene-water suspensions of the test organism were filtered and the number of bacteria present before and after filtration were enumerated by standard plate counts. After 24 hours incubation at 37° C. counts of bacteria were obtained as listed in Table V, below, in number of bacteria/ml.

*Table V*

| $CCl_2CCl_2—H_2O$ Suspension | Bacteria/ml. | | | |
|---|---|---|---|---|
| | Untreated DE | | PEI coated DE | |
| | Pre-filtration | Post-filtration | Pre-filtration | Post-filtration |
| *A. aerogenes* | 16,000 | 8,000 | 14,000 | 0 |
| *S. aureus* | 17,000 | 3,000 | 8,000 | 0 |
| *B. subtilis* | 19,000 | 2,000 | 20,000 | 0 |

EXAMPLE 8

The capacity of PEI treated DE to remove microorganisms from air by filtration was demonstrated by placing a dry filter medium, consisting of DE spray-treated with PEI to prepare a coated filter aid having 0.2 weight percent PEI, in a No. 2 Buechner funnel with a No. 2 Whatman filter paper used to support the coated filter aid. This filter was then connected by means of a cored rubber stopper to a nitro-cellulose ester membrane filter. The system was brought to vacuum and the flow rate controlled at 600 liters/hr. Upon completion of a filtration run, the membrane filter (0.45 micron pore size) was cultured on Standard Methods Agar and the microorganisms enumerated. The results in total bacteria and fungi present at various time intervals is listed in Table VI, below:

*Table VI*

| Filter media | Time (min.) | Bacteria-Fungi Count |
|---|---|---|
| None | 15 | 24 |
| Do | 30 | 42 |
| Do | 60 | 63 |
| Untreated DE | 15 | 13 |
| Do | 30 | 29 |
| Do | 60 | 54 |
| 0.2 weight percent PEI coating on DE | 15 | 0 |
| Do | 30 | 0 |
| Do | 60 | 0 |

EXAMPLE 9

The following experiment was conducted to determine the effectiveness of the filter aid coating in preventing the growth of microorganisms through the filter bed.

Diatomaceous earth was slurried with an 0.2 weight percent aqueous solution of the polyalkylenepolyamine of Example 1, having an average molecular weight of 400, and formed into an approximately ¼ inch thick filter bed in a standard Buechner funnel. The funnel was connected to a 500 ml. filter flask containing 100 ml. of sterile nutrient broth and successive portions of a heavily bacteria-contaminated water were filtered through the coated filter medium over a three day period. Any turbidity occurring in the nutrient broth was indicative of bacterial growth, in this case due to bacterial "grow through," since the starting system was sterile, the only access to the broth was through the filter media, and the coated filter aid removed all bacteria from the contaminated solution being filtered. An untreated DE filter bed was employed as a control. The results are tabulated in Table VII, below.

*Table VII*

| Time (hrs.) | Untreated DE | Coated DE |
|---|---|---|
| 16 | Visible growth | No growth. |
| 24 | do | Do. |
| 48 | do | Do. |
| 72 | do | Do. |

We claim:

1. A method for the removal of microorganisms from fluids which comprises passing a fluid containing microorganisms through an anionic-type filter aid having an adherent coating of an organic, cationic, polyelectrolyte, which has a minimum of about 10 cationic charge sites per molecule, said coating constituting from about 0.01 to 2 percent of the total weight of the coated filter aid.

2. The method of claim 1 wherein said adherent cationic coating is a polyethylenimine.

3. The method of claim 1 wherein said adherent cationic coating is a polyalkylenepolyamine.

4. A rapid-flow method for the removal of bacterial, fungal and viral microorganisms from fluids which comprises passing a fluid containing at least one of said microorganisms through an anionic-type filter aid having an adherent coating of a predominantly linear, organic, cationic, polyelectrolyte which has a minimum of about 10 cationic charge sites per molecule; said coating constituting from about 0.05 to 0.2 weight percent of the coated filter-aid.

5. The method of claim 1 wherein said microorganism-containing fluid is a liquid.

6. The method of claim 1 wherein said microorganism-containing fluid is a gas.

7. The method of claim 5 wherein said liquid is water.

8. The method of claim 6 wherein said gas is air.

9. The method of claim 1 wherein said coated filter aid is periodically re-coated by adding an organic, cationic, polyelectrolyte, which has a minimum of about 10 cationic charge sites per molecule, to the influent fluid.

References Cited by the Examiner

UNITED STATES PATENTS

| | | | |
|---|---|---|---|
| 2,040,818 | 4/1936 | Badollet | 210—506 |
| 2,247,711 | 7/1941 | Ralston | 210—64 |
| 2,692,231 | 10/1954 | Stayner et al. | 210—64 |
| 2,732,350 | 1/1956 | Clarke | 210—501 XR |
| 2,841,526 | 7/1958 | Gustus | 167—72 |

MORRIS O. WOLK, *Primary Examiner.*